United States Patent
Okamoto

(10) Patent No.: US 8,559,641 B2
(45) Date of Patent: Oct. 15, 2013

(54) APPLICATION PROGRAM DISTRIBUTING APPARATUS, IMAGE PROCESSING APPARATUS AND PROGRAM, ALLOWING DATA COMMUNICATIONS USING S/MIME AT EASE

(75) Inventor: Tomoyuki Okamoto, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1040 days.

(21) Appl. No.: 11/896,636

(22) Filed: Sep. 4, 2007

(65) Prior Publication Data

US 2008/0056502 A1 Mar. 6, 2008

(30) Foreign Application Priority Data

Sep. 4, 2006 (JP) ................................. 2006-238724

(51) Int. Cl.
*H04L 29/06* (2006.01)

(52) U.S. Cl.
USPC .......................................................... 380/283

(58) Field of Classification Search
USPC .......................................................... 380/283
See application file for complete search history.

(56) References Cited

U.S. PATENT DOCUMENTS

| | | | |
|---|---|---|---|
| 4,984,271 A | 1/1991 | Goto | |
| 6,438,594 B1* | 8/2002 | Bowman-Amuah | 709/225 |
| 6,609,196 B1* | 8/2003 | Dickinson et al. | 713/154 |
| 7,127,741 B2* | 10/2006 | Bandini et al. | 726/14 |
| 7,275,261 B2* | 9/2007 | Kutaragi et al. | 726/26 |
| 7,293,171 B2* | 11/2007 | Batthish et al. | 713/152 |
| 7,296,157 B2* | 11/2007 | Partelow et al. | 713/171 |
| 7,328,451 B2* | 2/2008 | Aaron | 726/13 |
| 7,401,356 B2* | 7/2008 | Bandini et al. | 726/14 |
| 7,669,227 B2* | 2/2010 | Malcolm | 726/1 |
| 2002/0174422 A1* | 11/2002 | Kelley et al. | 717/178 |
| 2003/0188151 A1 | 10/2003 | Sato et al. | |
| 2003/0188167 A1 | 10/2003 | Kurosaki et al. | |
| 2004/0019780 A1 | 1/2004 | Waugh et al. | |
| 2005/0163121 A1* | 7/2005 | Asano | 370/389 |
| 2006/0218634 A1* | 9/2006 | Sodhi et al. | 726/22 |

(Continued)

FOREIGN PATENT DOCUMENTS

| | | |
|---|---|---|
| JP | 63278438 A | 11/1998 |
| JP | 2002-185444 A | 6/2002 |

(Continued)

OTHER PUBLICATIONS

Translation of Japanese Official Action mailed Jun. 17, 2008.

(Continued)

*Primary Examiner* — Edan Orgad
*Assistant Examiner* — James Turchen
(74) *Attorney, Agent, or Firm* — Buchanan Ingersoll & Rooney PC

(57) ABSTRACT

An S/MIME intermediate application is installed on a PC. The S/MIME intermediate application causes the PC to execute monitoring processing of monitoring data transmitted externally via a network by an e-mail software program or a printer driver, and encryption processing of encrypting the data to be transmitted when a predetermined requirement is satisfied. An MFP distributes the S/MIME intermediate application to the PC. The MFP stores therein an encryption key used in the encryption processing, and distributes the encryption key together with the S/MIME intermediate application, in response to a request from the PC.

23 Claims, 12 Drawing Sheets

(56) References Cited

U.S. PATENT DOCUMENTS

| | | | |
|---|---|---|---|
| 2006/0288206 A1* | 12/2006 | Kojima | 713/165 |
| 2007/0005682 A1* | 1/2007 | Ishibashi | 709/202 |
| 2007/0174636 A1* | 7/2007 | Raja | 713/189 |
| 2007/0255628 A1* | 11/2007 | Takahashi et al. | 705/26 |
| 2008/0267402 A1* | 10/2008 | Kimura | 380/243 |

FOREIGN PATENT DOCUMENTS

| | | |
|---|---|---|
| JP | 2003-36231 A | 2/2003 |
| JP | 2004040660 A | 2/2004 |
| JP | 2004201039 A | 7/2004 |
| JP | 2005534049 T | 11/2005 |
| WO | WO 2004010661 | 11/2005 |

OTHER PUBLICATIONS

Masato Kurosaki et al., Introduction of PKI Technology and Device Certificate, with English Abstract. Fuji Xerox Technical Report, 2005, No. 15, pp. 23-31 URL, http://www.fujixerox.co.jp/company/tr/15/.

* cited by examiner

FIG.5A REGISTRATION USER INFORMATION OF MFP100

| NUMBER | USER IDENTIFIER | USER PERSONAL INFORMATION ||||
| --- | --- | --- | --- | --- | --- |
| | | ACCOMPANYING INFORMATION A | ADDRESS BOOK A | PANEL SETTING INFORMATION A | AUTHENTICATION INFORMATION A | HISTORY INFORMATION A |
| 1 | DAVID | | | | | |

FIG.5B REGISTRATION USER INFORMATION OF MFP100A

| NUMBER | USER IDENTIFIER | USER PERSONAL INFORMATION ||||
| --- | --- | --- | --- | --- | --- |
| | | ACCOMPANYING INFORMATION B | ADDRESS BOOK B | PANEL SETTING INFORMATION B | AUTHENTICATION INFORMATION B | HISTORY INFORMATION B |
| 2 | JULIE | | | | | |

FIG.5C REGISTRATION USER INFORMATION OF MFP100B

| NUMBER | USER IDENTIFIER | USER PERSONAL INFORMATION ||||
| --- | --- | --- | --- | --- | --- |
| | | ACCOMPANYING INFORMATION | ADDRESS BOOK | PANEL SETTING INFORMATION | AUTHENTICATION INFORMATION | HISTORY INFORMATION |
| 3 | MICHAEL | ACCOMPANYING INFORMATION C | ADDRESS BOOK C | PANEL SETTING INFORMATION C | AUTHENTICATION INFORMATION C | HISTORY INFORMATION C |
| 4 | SUSAN | ACCOMPANYING INFORMATION D | ADDRESS BOOK D | PANEL SETTING INFORMATION D | AUTHENTICATION INFORMATION D | HISTORY INFORMATION D |

FIG.5D USER DATA

| NUMBER | USER IDENTIFIER | HOME TERMINAL |
| --- | --- | --- |
| 1 | DAVID | IP ADDRESS OF MFP100 |
| 2 | JULIE | IP ADDRESS OF MFP100A |
| 3 | MICHAEL | IP ADDRESS OF MFP100B |
| 4 | SUSAN | IP ADDRESS OF MFP100B |

FIG.7

```
S/MIME INTERMEDIATE APPLICATION DISTRIBUTION
REQUEST SCREEN

MFPID    :  MFP100
                                    331
USABLE PERIOD           :  [  30  ]  DAY(S) (1~90)   332
E-MAIL ADDRESS OF
TRANSMITTING SOURCE     :  [ okamoto@abc.ne.jp  ]
PASSWORD                :  [ * * * * * * ]—333
```

334 — [✓] TRANSMIT/RECEIVE S/MIME MESSAGE TO/FROM ANOTHER E-MAIL ADDRESS WHICH CAN BE ENCRYPTED USING S/MIME AND IS REGISTERED IN THIS MFP

335 — [ ] TRANSMIT/RECEIVE S/MIME MESSAGE TO/FROM MFP, WHICH CAN PERFORM S/MIME ENCRYPTION, OTHER THAN THIS MFP

336 — [ ] PERFORM ENCRYPTION/DECRYPTION USING S/MIME ON DATA TRANSMITTED/RECEIVED THROUGH PROTOCOL OTHER THAN E-MAIL

[ ] LPR    [ ] IPP    [ ] SMB
  3361       3362       3363

FIG.8

| NAME | E-MAIL ADDRESS OF TRANSMITTING DESTINATION | PUBLIC KEY | PRIVATE KEY | MFPID | IP ADDRESS |
|---|---|---|---|---|---|
| MFP100 | mfp100@abc.ne.jp | PUBLIC KEY OF MFP100 | PRIVATE KEY OF MFP100 | MFP100 | 192.168.1.1 |
| okamoto | okamoto@abc.ne.jp | PUBLIC KEY OF NAME, okamoto | PRIVATE KEY OF NAME, okamoto | (NONE) | (NONE) |
| toyama | toyama@abc.ne.jp | PUBLIC KEY OF NAME, toyama | PRIVATE KEY OF NAME, toyama | (NONE) | (NONE) |
| MFP100A | mfp100a@abc.ne.jp | PUBLIC KEY OF MFP100A | (NONE) | MFP100A | 192.168.1.2 |
| MFP100B | mfp100b@abc.ne.jp | PUBLIC KEY OF MFP100B | (NONE) | MFP100B | 192.168.1.3 |

APPLICATION PROGRAM DISTRIBUTING APPARATUS, IMAGE PROCESSING APPARATUS AND PROGRAM, ALLOWING DATA COMMUNICATIONS USING S/MIME AT EASE

This application is based on Japanese Patent Application No. 2006-238724 filed with the Japan Patent Office on Sep. 4, 2006, the entire content of which is hereby incorporated by reference.

BACKGROUND OF THE INVENTION

1. Field of the Invention

The present invention relates to an application program distributing apparatus, an image processing apparatus and a program.

2. Description of the Related Art

Conventional examples of a protocol for transmission of an e-mail on the Internet include SMTP (Simple Mail Transfer Protocol), MIME (Multipurpose Internet Mail Extensions) and the like. In general, an e-mail transmitted using such a protocol is not subjected to encryption processing and, consequently, has a problem of interception by a third party. In order to solve this problem, there has been devised a protocol referred to as S/MIME (Secure/Multipurpose Internet Mail Extensions).

However, Japanese Laid-Open Patent Publication No. 2003-036231 (see paragraph "0006") points out a disadvantage of transmission of an e-mail using the S/MIME. That is, the transmission using the S/MIME requires complicated operation and management and, consequently, does not come into widespread use, contrary to expectations.

In order to put the S/MIME into widespread use, it is considered that an e-mail transmission program (mailer) is allowed to have a function of encrypting/decrypting an S/MIME e-mail. However, a high-performance mailer having a complicated structure becomes a target for an illegal program such as a computer virus in some cases. In addition, some users prefer a mailer having a simple structure.

SUMMARY OF THE INVENTION

The present invention is devised in view of the aforementioned circumstances. An object of the present invention is to provide an application program distributing apparatus, an image processing apparatus and a program. This application program distributing apparatus distributes an application program allowing communications of data subjected to encryption processing at ease even in a case of using a mailer having a simple structure.

In order to accomplish this object, one aspect of the present invention provides an application program distributing apparatus for distributing an application program running on an information processing apparatus. Herein, the application program to be distributed causes the information processing apparatus to execute at least monitoring processing of monitoring data transmitted externally from the information processing apparatus via a network by another application program running on the information processing apparatus, and encryption processing of encrypting the data to be transmitted when a predetermined requirement is satisfied. The application program distributing apparatus includes: an encryption key storage unit for storing therein an encryption key used in the encryption processing; and an encryption key extraction unit for extracting, from the encryption key storage unit, the encryption key to be distributed together with the application program upon distribution of the application program.

According to the above-described structure, the application program distributed by the application program distributing apparatus causes the information processing apparatus to monitor the data transmitted externally by the another application program and to encrypt the data to be transmitted when the predetermined requirement is satisfied. Thus, it is possible to carry out communications of data subjected to encryption processing at ease.

Herein, the information processing apparatus monitors at least a port number of an IP header to be transmitted externally, in the monitoring process. In addition, the information processing apparatus executes the encryption processing using S/MIME (Secure/Multipurpose Internet Mail Extensions).

The predetermined requirement is that the data to be transmitted is data of an e-mail transmitted on the Internet and the information processing apparatus receives an encryption key corresponding to an e-mail address of a transmitting destination.

The application program to be distributed starts to run on boot-up of the information processing apparatus, independently of the another application program.

The application program distributing apparatus further includes a request key information reception unit for receiving, from a distribution requesting source, information suggesting encryption of data to be transmitted to which transmitting destination, in the encryption processing. Herein, the encryption key extraction unit executes the encryption key extraction processing on the basis of the information received by the request key information reception unit.

The application program distributing apparatus further includes an encryption key generation unit for generating an encryption key for a requesting source which requests the distribution of the application program.

The another application program issues a request of image-data processing to an external image processing apparatus.

Another aspect of the present invention also provides an image processing apparatus for distributing, via a network, an application program running on an information processing apparatus connected to the network. Herein, the application program to be distributed causes the information processing apparatus to execute at least monitoring processing of monitoring data transmitted to the image processing apparatus via the network by another application program running on the information processing apparatus, and encryption processing of encrypting the data to be transmitted when a predetermined requirement is satisfied. The image processing apparatus includes: an encryption key storage unit for storing therein an encryption key used in the encryption processing; and an encryption key extraction unit for extracting, from the encryption key storage unit, the encryption key to be distributed together with the application program upon distribution of the application program.

The predetermined requirement is that the data to be transmitted is data of an e-mail transmitted on the Internet and the information processing apparatus receives an encryption key corresponding to an e-mail address of a transmitting destination.

The another application program issues a request of imaging processing to one of the image processing apparatus and another image processing apparatus.

The predetermined requirement is that the information processing apparatus receives an encryption key for the image processing apparatus which is a requesting destination to which the request of the imaging processing is issued.

The information processing apparatus executes the encryption processing using S/MIME (Secure/Multipurpose Internet Mail Extensions).

The image processing apparatus further includes a request key information reception unit for receiving information suggesting encryption of data to be transmitted to which image processing apparatus, in the encryption processing. Herein, the encryption key extraction unit executes the encryption key extraction processing on the basis of the information received by the request key information reception unit.

The encryption key extraction unit extracts all of encryption keys stored in the image processing apparatus.

The image processing apparatus further includes a transmission protocol information reception unit for receiving information suggesting encryption of data to be transmitted using which protocol, in the encryption processing. Herein, the image processing apparatus changes details of processing performed by the application program to be distributed, on the basis of the information received by the transmission protocol information reception unit.

The application program causes the information processing apparatus to execute encryption key acquisition processing of newly acquiring, from an image processing apparatus determined as an identical group, an encryption key for the image processing apparatus.

The image processing apparatus further includes a decryption unit for decrypting externally received data when the data is subjected to encryption processing using S/MIME.

Still another aspect of the present invention also provides a computer readable medium storing a program for causing an information processing apparatus to execute processing including: monitoring processing of monitoring data transmitted externally from the information processing apparatus via a network by another application program running on the information processing apparatus; and encryption processing of encrypting the data to be transmitted using S/MIME (Secure/Multipurpose Internet Mail Extensions) when a predetermined requirement is satisfied.

The another application program issues a request of image-data processing to an external image processing apparatus.

The application program distributing apparatus and the like according to the present invention have an advantage of allowing communications of data encrypted at ease.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A to 5D show registration user information and user data.

FIG. 7 shows an intermediate application distribution request screen displayed on a browser in a PC.

FIG. 8 shows contents stored in a key storage unit.

DESCRIPTION OF THE PREFERRED EMBODIMENTS

Figure 1:
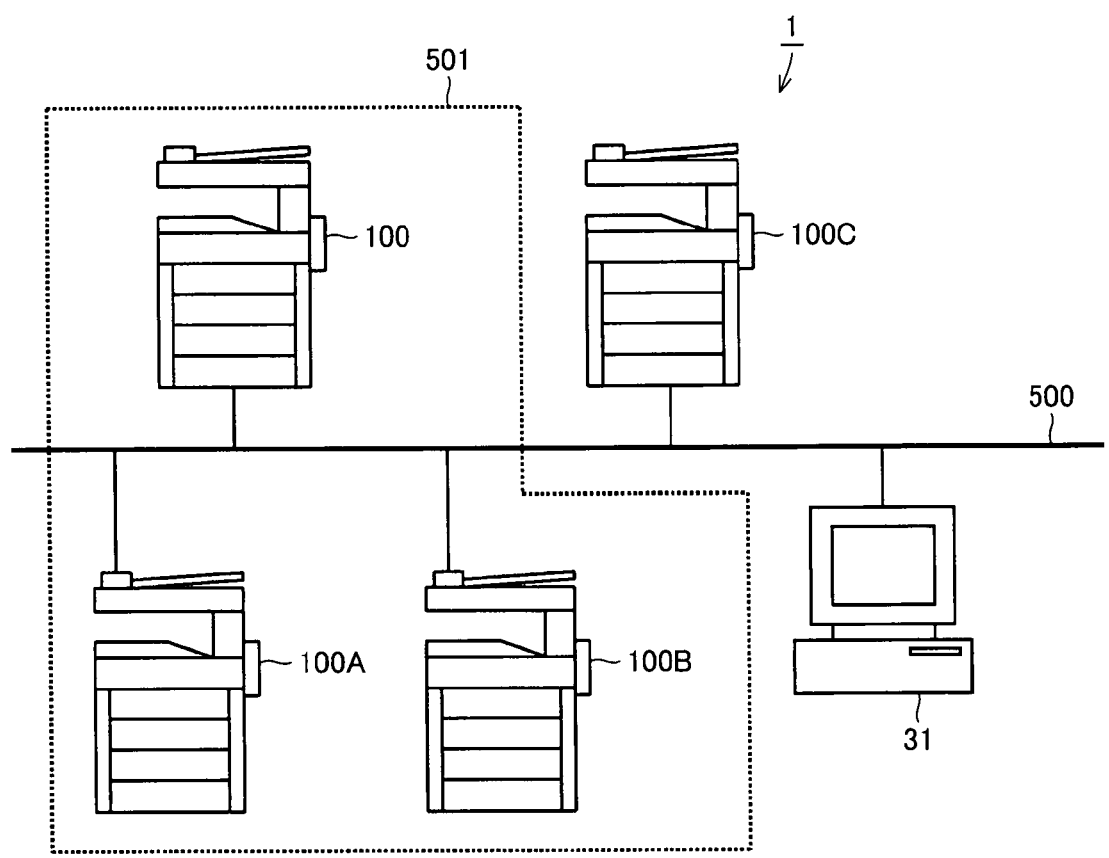
FIG. 1 shows a configuration of an image processing system.

Hereinafter, an embodiment of the present invention is described with reference to the drawings.
(1) Configuration of Image Processing System FIG. 1 shows a configuration of an image processing system according to the embodiment of the present invention. As shown in FIG. 1, image processing system 1 has the following configuration that MFPs (Multi Function Peripherals) 100, 100A, 100B and 100C, a PC (Personal Computer) 31 and the like are connected to a network 500. In this embodiment, there is described a case that MFPs 100, 100A, 100B and 100C are equal in configuration and function to each other. Hereinafter, therefore, MFP 100 is described as an example unless otherwise specified.

An MFP is an image processing apparatus which functions as a copying machine, a network printer, a scanner, a facsimile, a document server and the like and, therefore, is referred to as a complex machine in some cases. In this embodiment, such an MFP is described as an example. However, a scanner, a printer, a facsimile or the like, which has a function of processing an image, may be used as the image processing apparatus. As an application program distributing apparatus, there may be used not only an image processing apparatus such as an MFP, but also an information processing apparatus such as a PC.

In this embodiment, network 500 is a LAN (Local Area network), and a connection condition may be either wired or wireless. Alternatively, network 500 is not limited to a LAN, and may be a WAN (Wide Area Network) such as the Internet, a network using a typical public communication circuit, or the like. Moreover, network 500 may be a VPN (Virtual Private Network).

In this embodiment, MFP 100, MFP 100A and MFP 100B belong to a single workgroup to form a virtual sub-network 501. A method of forming a virtual sub-network as a single group is not limited to a method of causing MFPs to belong to a single workgroup. For example, a group name may be registered separately. Herein, the number of image processing apparatuses such as an MFP and the number of information processing apparatuses such as a PC, and the number of image processing apparatuses forming virtual sub-network 501 are optional in image processing system 1, respectively.
(2) Configuration of MFP 100

Figure 2:
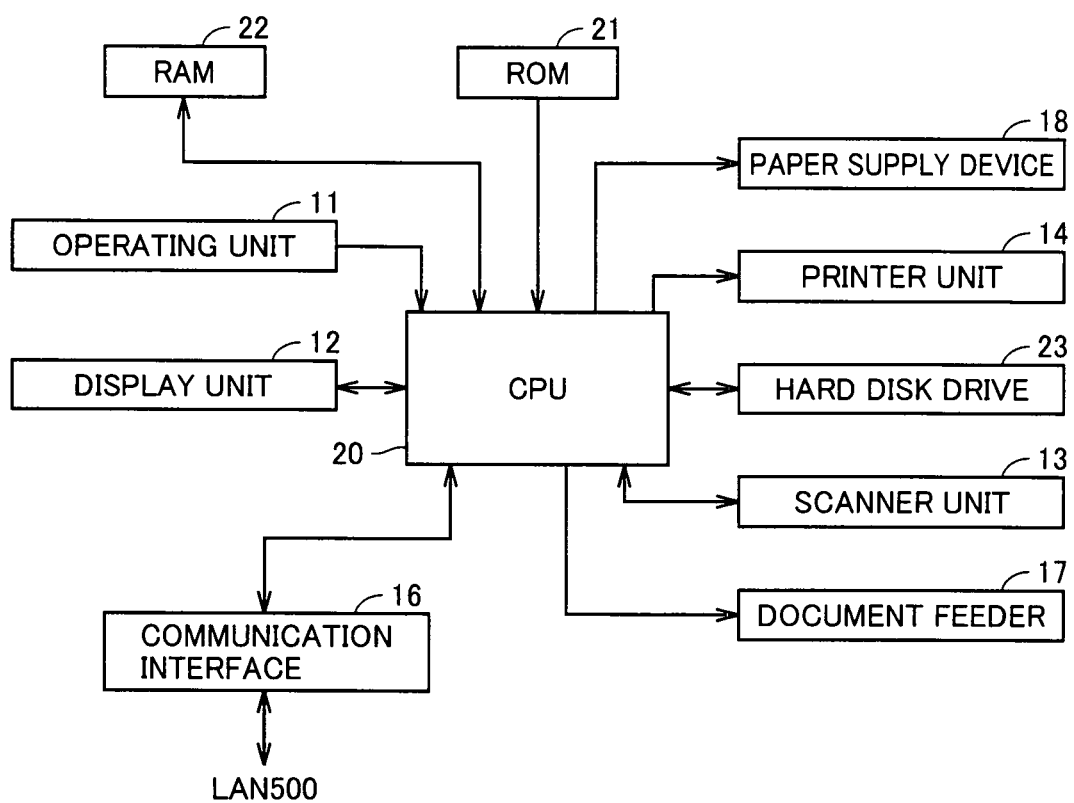
FIG. 2 shows a block diagram of a hardware configuration of an MFP according to an embodiment of the present invention.
Figure 3:
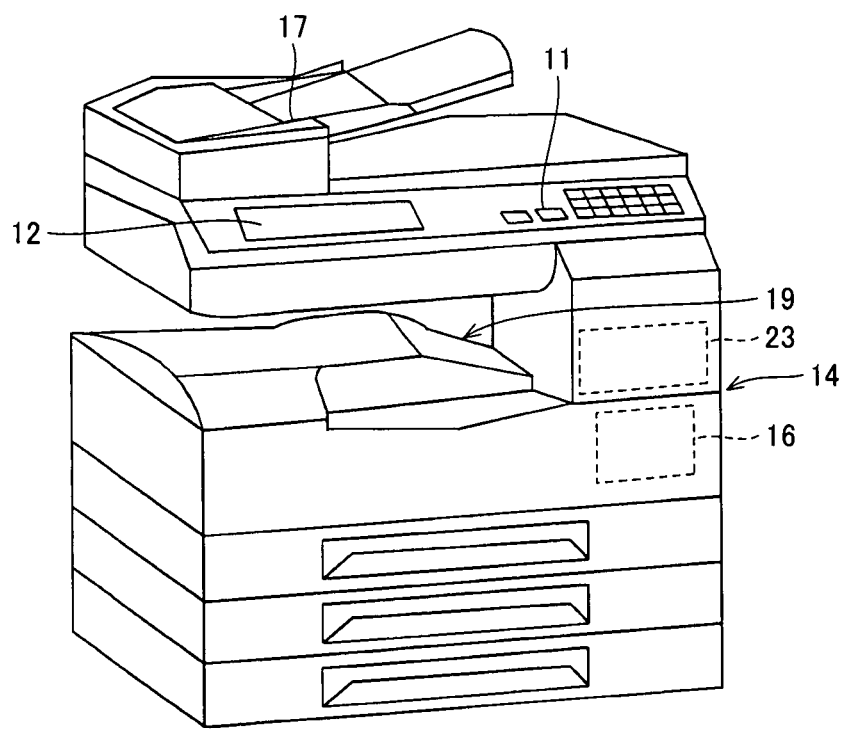
FIG. 3 shows an outer appearance of the MFP.

FIG. 2 shows a block diagram of a hardware configuration of MFP 100. FIG. 3 shows an outer appearance of MFP 100. As shown in FIG. 2, MFP 100 includes a CPU 20, a ROM 21 which records thereon a program to be executed by CPU 20, a RAM 22 which stores therein data for loading of a program to be executed and data under execution of a program, a hard disk drive 23 which stores data therein in a nonvolatile manner, and a communication interface 16 which connects MFP 100 to network 500.

MFP 100 also includes an operating unit 11 and a display unit 12 each of which is connected to CPU 20. MFP 100 also includes a scanner unit 13, a printer unit 14, a document feeder 17 and a paper supply device 18 each of which is actuated under control by CPU 20.

CPU 20 loads on RAM 22 an image processing program recorded on ROM 21, thereby executing the image processing program. Herein, a recording medium for recording thereon an image processing program is not limited to ROM 21, and may be a rewritable nonvolatile semiconductor memory such as a flash ROM. In addition, various disks such as a flexible disk, an MO, an MD and a DVD, an IC card (including a memory card) and the like may be used appropriately. In a case of using a rewritable nonvolatile memory such as a flash ROM, CPU 20 in MFP 100 may download a program from another image processing apparatus such as an MFP connectable to MFP 100 via network 500, thereby updating the image processing program.

Operating unit 11 is an input device such as a group of various buttons or a touch panel for accepting user's input for operating MFP 100. Examples of display unit 12 may include a liquid crystal display device, an organic EL display panel and the like. It is assumed herein that a touch panel made of a transparent material is used as an example of operating unit 11. Since the touch panel is provided on display unit 12, it is possible to detect a command for a button displayed on display unit 12.

Scanner unit 13 irradiates with light an image such as a photograph, a character, a picture or a graph depicted on a document, reads the reflected light, and generates digital image data (herein, density data indicating density of RGB or black). Such image data obtained as described above is used for printing in printer unit 14. Moreover, such image data is converted into a file having a format such as TIFF, PDF or JPEG, and then is stored in hard disk drive 23. Herein, MFP 100 may transmit the image file to another MFP via communication interface 16 and network 500 or may transmit the image file via fax. Document feeder 17 is provided on a top side of a main body of MFP 100 (see FIG. 3), and is used for feeding one or more documents to scanner unit 13 successively.

Printer unit 14 prints an image read by scanner unit 13, an image corresponding to image data transmitted from another image processing apparatus such as an MFP, a received fax image or the like on a recording sheet such as paper or a film. Paper supply device 18 is provided at a lower side of the main body of MFP 100, and is used for supplying to printer unit 14 a recording sheet optimal for an image to be printed. A recording sheet, on which printer unit 14 prints an image, is delivered to a discharge tray 19 (see FIG. 3).

Communication interface 16 is an interface for exchanging data with another MFP via network 500, or an interface for transmitting/receiving data via fax using a telephone circuit. Examples of communication interface 16 may include an NIC (Network Interface Card), a TA (Terminal Adaptor) and the like.

(3) Configuration of Virtual Sub-Network 501

In this embodiment, users who mainly use MFPs 100, 100A and 100B, respectively, are previously allocated to MFPs 100, 100A and 100B, respectively, in virtual sub-network 501. Therefore, each of MFPs 100, 100A and 100B stores therein registration user information for registration of a user who mainly uses the relevant MFP. The registration user information will be described later. The registration user information contains at least a user identifier for identifying a user.

In this embodiment, an MFP which stores therein registration user information about a user who uses the MFP is referred to as a "home terminal". For example, in a case that MFP 100 stores therein registration user information about a user "David", a home terminal of the user "David" is MFP 100. Herein, each of MFPs 100, 100A and 100B stores therein registration user information in order to previously allocate users who mainly use MFPs 100, 100A and 100B to MFPs 100, 100A and 100B, thereby improving operability. Therefore, such registration of a user is not intended for inhibiting a user from using an MFP storing no registration user information about the user.

It is assumed in this embodiment that MFP 100C is different in workgroup from MFPs 100, 100A and 100B. Accordingly, MFP 100C is not recognized as an image processing apparatus forming virtual sub-network 501. That is, in order to form virtual sub-network 501 in this embodiment, image processing apparatuses exchange workgroup information with each other through a broadcast packet. Thereafter, image processing apparatuses belonging to a single workgroup form a virtual sub-network.

It is assumed herein that MFPs 100A and 100B are already connected to network 500 to form virtual sub-network 501 and MFP 100 is newly connected to network 500. It is necessary to set at MFP 100 apparatus identification information for identifying MFP 100 and registration user information. When the apparatus identification information and the registration user information are set at MFP 100, MFP 100 transmits the apparatus identification information and the registration user information to MFPs 100A and 100B. Thus, MFPs 100, 100A and 100B form virtual sub-network 501.

Figure 4:
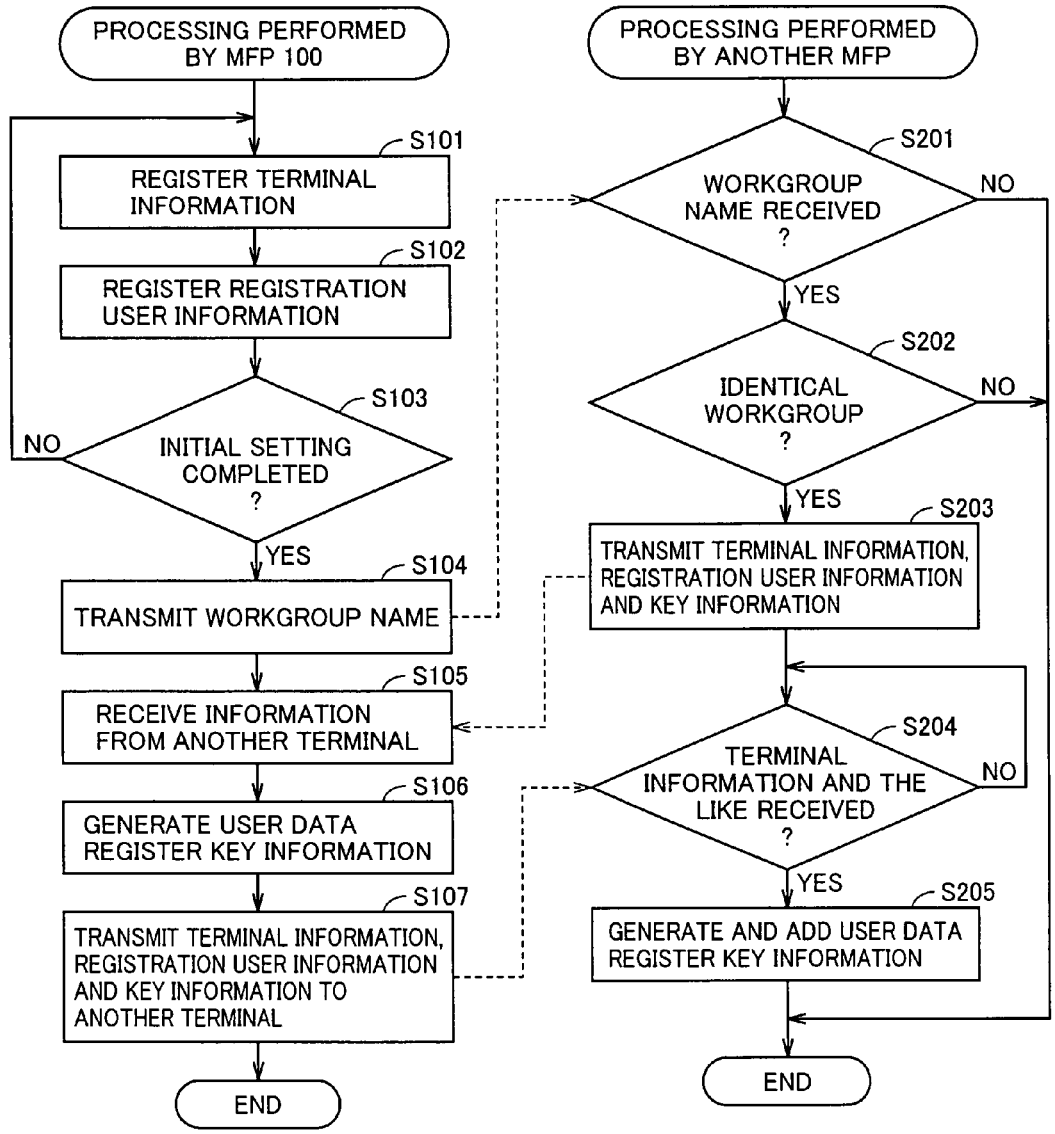
FIG. 4 shows a flowchart of details of processing performed by the MFP to be connected to a network newly and details of processing performed by another MFP.

Hereinafter, specific details of processing performed upon formation of virtual sub-network 501 are described using MFP 100 as an example. FIG. 4 shows a flowchart of details of processing performed by MFP 100, which is newly connected to network 500, and details of processing performed by another MFP.

Prior to formation of virtual sub-network 501, first, MFP 100 registers therein terminal information (S101). The terminal information contains apparatus identification information for identifying MFP 100, and a workgroup name. Preferably, the apparatus identification information is information about a position of MFP 100 in network 500. For example, an IP address may be used as the apparatus identification information. Next, MFP 100 receives registration user information about a user who uses MFP 100 as a home terminal (S102). If a plurality of users use MFP 100 as a home terminal, MFP 100 receives a plurality of pieces of registration user information about the plurality of users.

The registration user information contains a user identifier for identifying a user. Preferably, the user identifier is information unique to each user, such as a user ID or a user name consisting of characters or symbols. In this embodiment, a user name is used as the user identifier. In addition to the user identifier, the registration user information further contains personal information for each user. The user personal information is information about the user of MFP 100. For example, the user personal information contains accompanying information, an address book, panel setting information, authentication information and history information. The user personal information is utilized as follows. That is, upon formation of virtual sub-network 501, the user accesses virtual sub-network 501. Herein, the user personal information allows the user to log in an MFP different from the home terminal, so that operability is improved.

The terminal information and the registration user information are inputted by the user through operating unit 11. More specifically, a terminal information input screen and a registration user information input screen are displayed on display unit 12. The user operates operating unit 11 in accordance with the screens, thereby inputting the terminal information and the registration user information. Herein, registration of the terminal information is usually performed by a terminal administrator while input of the registration user information is usually performed by the user.

Thereafter, MFP 100 determines whether or not initial setting therein is completed (S103). If the initial setting is not completed yet, the processing returns to step S101. On the other hand, if the initial setting is completed (YES in S103), MFP 100 broadcast-transmits a workgroup name to another terminal (S104).

The another terminal such as MFP 100A connected to network 500 receives the workgroup name from MFP 100 (YES in S201), and then determines whether or not a workgroup name thereof is identical to the received workgroup name (S202).

If MFP 100 and the another terminal belong to a single workgroup (YES in S202), the another terminal transmits to MFP 100 terminal information and registration user information thereof, and key information for use in S/MIME encryption processing (to be described later) (S203). Herein, MFP 100C is different in workgroup name from the another terminal. Therefore, the another terminal does not transmit the terminal information and the like thereof to MFP 100C. Thus, the terminals which are identical in workgroup name to each other form virtual sub-network 501.

On the other hand, MFP 100 receives the information from the terminal (MFP 100A or MFP 100B) belonging to the single workgroup (S105). Then, MFP 100 generates user data and registers therein the received key information (S106). MFP 100 transmits the terminal information registered therein in the initial setting, the registration user information, and key information thereof to the another terminal (S107).

The another terminal (MFP 100A or MFP 100B) receives the terminal information, the registration user information and the key information from MFP 100 (YES in S204). Then, the another terminal generates and adds user data, and registers therein the key information about MFP 100 (S205). Thus, the key information for use in the S/MIME encryption processing is shared between the image processing apparatuses forming virtual sub-network 501.

In this embodiment, the user data generated by each of MFP 100 and the another terminal is a summary of the terminal information and the registration user information about MFPs 100, 100A and 100B, and contains terminal information and a user identifier of each terminal. Such user data is stored in a hard disk drive of each MFP. Thus, single user data is stored in each of MFPs 100, 100A and 100B.

In this embodiment, the initial setting executed in MFP 100 includes registration of terminal information and input of registration user information. In a case that MFP 100 is already connected to network 500 and a new user is added to MFP 100, processing similar to the initial setting is executed. In this case, the registration of terminal information in step S101 becomes unnecessary.

Herein, the initial setting is executed in the case that MFPs 100, 100A and 100B are connected to network 500; however, the present invention is not limited thereto. For example, the initial setting may be executed after power-on of MFPs 100, 100A and 100B or may be executed at predetermined time intervals. Thus, MFP 100 can acquire registration user information about a user who is newly registered in another MFP 100A or 100B, thereby storing therein latest user data. In this case, MFP 100 issues a registration user information transmission request to the another terminal such as MFP 100A or 100B having a workgroup name which is identical to that of MFP 100, without executing the initial setting from step S101 to step S103 shown in FIG. 4.

In response to this transmission request from MFP 100, MFP 100A or 100B executes the processing shown in FIG. 4, and then transmits the registration user information stored in a hard disk drive thereof to MFP 100. Thus, even when the registration user information stored in MFP 100A or 100B is changed, MFP 100 generates user data from the changed registration user information and stores the generated user data in hard disk drive 23 thereof.

FIGS. 5A to 5D show registration user information and user data. Specifically, FIG. 5A shows registration user information registered in MFP 100. FIG. 5B shows registration user information registered in MFP 100A. FIG. 5C shows registration user information registered in MFP 100B. FIG. 5D shows user data.

In this embodiment, registration user information contains a number, a user identifier and user personal information. The user personal information contains accompanying information, an address book, panel setting information, authentication information and history information. The accompanying information is information unique to each user, and examples thereof include a name of a department to which a user belongs, an e-mail address allocated to the user, face image data obtained by taking an image of a face of the user, and the like.

The address book, which is registered by the user, is information about a transmittable destination. For example, the address book contains a user identifier, an e-mail address, a fax number and the like of the user of the transmitting destination. Herein, the address book may contain initial setting for a transmission method to each registered user (for example, designation of a transmission method by e-mail or via fax).

The panel setting information is screen information customized by the user. The authentication information is information for use in authentication of the user when the user logs in virtual sub-network 501. Herein, a password is used as the authentication information. In this embodiment, log-in in a case of utilizing virtual sub-network 501 and log-in in a case of utilizing MFP 100 can be performed independently. Therefore, authentication information for logging in virtual sub-network 501 and a password for logging in MFP 100 are managed independently.

In the case of logging in virtual sub-network 501, the face image data may be used as the authentication information. Example of the authentication information which adopts biometric authentication include a finger print, a voice print, an iris, a venous pattern and the like. The history information is data generated by MFP 100, 100A or 100B when the user issues a command for executing processing to MFP 100, 100A or 100B, and contains contents of the command. If the command is a command for transmitting an e-mail, for example, contents of the command are a fact that an e-mail is transmitted, a transmitting destination, and details of the transmission. The user data shown in FIG. 5D contains a number, a user identifier, and apparatus identification information of a home terminal.

As described above, MFPs 100, 100A and 100B having an identical workgroup name generate single user data, and then store the user data therein. Thus, MFPs 100, 100A and 100B form virtual sub-network 501. By formation of virtual sub-network 501, it is possible to specify a user who uses one of MFPs 100, 100A and 100B as a home terminal, on the basis of the user data. Therefore, in a case that the user uses the user data to operate a terminal other than the home terminal, the terminal can receive user personal information of the user from the home terminal.

(4) Configuration of Application Program Distributing Apparatus

In this embodiment, each MFP functions as an application program distributing apparatus according to this embodiment. Hereinafter, a configuration of the application program distributing apparatus is described using MFP 100 as an example. For example, the application program distributing apparatus distributes an application program in response to a request from PC 31.

The application program to be distributed in this embodiment is installed on PC 31, thereby allowing data communications using S/MIME at ease. Hereinafter, the application program to be distributed is referred to as an S/MIME intermediate application or is simply referred to as an "intermediate application". The intermediate application will be described in detail later.

Figure 6:
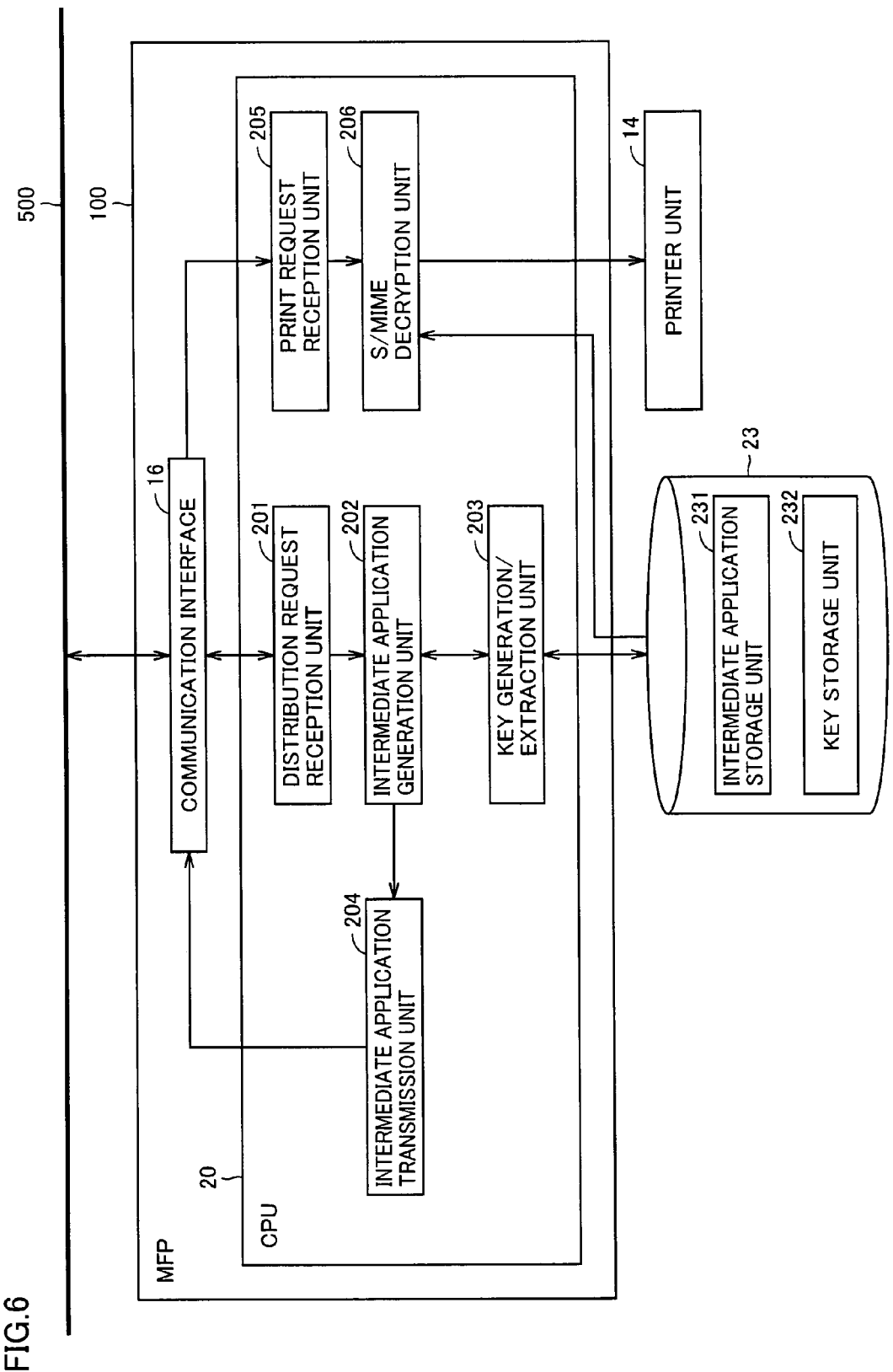
FIG. 6 shows a block diagram of a functional configuration of the MFP.

FIG. 6 shows a block diagram of a functional configuration of MFP 100 according to this embodiment. MFP 100 includes a distribution request reception unit 201, an intermediate application generation unit 202, a key generation/extraction unit 203, an intermediate application transmission unit 204, a print request reception unit 205 and an S/MIME decryption unit 206. These units are realized when the program runs on CPU 20. Herein, hard disk drive 23 includes an intermediate application storage unit 231 and a key storage unit 232.

Distribution request reception unit 201 receives an intermediate application distribution request from an external apparatus such as PC 31. In this embodiment, MFP 100 forms a Web-server. Therefore, the user can issues the intermediate application distribution request through a browser displayed on a display of the external apparatus such as PC 31. FIG. 7 shows a screen displayed on the browser in PC 31.

As shown in FIG. 7, the user can input a usable period of the intermediate application, an e-mail address of a transmitting source, and a password. In addition, the user can designate a key to be distributed as an encryption key to be packed with the intermediate application. Further, the user can designate a protocol for S/MIME processing.

Information to be inputted to a box 331 indicates a usable period during which the intermediate application can be used starting from a date on which the intermediate application is distributed. More specifically, the information indicates an expiry date of a private key and a digital certification (public key) each used for the S/MIME encryption processing in the information processing apparatus such as PC 31 which is a distributing destination. A key for the distributing destination is generated by key generation/extraction unit 203. As shown in FIG. 7, further, the user can input a numerical value ranging from 1 to 90. The intermediate application may be set such that the intermediate application can be used indefinitely if the user inputs, for example, "0" to box 331.

An e-mail address of a transmitting source, which is inputted to a box 332, indicates that an e-mail transmitted from the transmitting source, that is, the e-mail address inputted to box 332 is encrypted. A password to be inputted to a box 333 is a password set at an installer used when the intermediate application is installed on PC 31 which is the distributing destination.

In this embodiment, by checking a check box 334 or the like, the user can designate an encryption key to be packed with the intermediate application and a protocol for encrypting transmission data using S/MIME. For example, when check box 334 is checked, a key is packed with the intermediate application such that data encrypted using the S/MIME is transmitted to another e-mail address which is registered in an MFP receiving the intermediate application distribution request and can be encrypted using the S/MIME.

FIG. 8 shows contents stored in key storage unit 232 of MFP 100. Key storage unit 232 stores therein key information about MFP 100, an e-mail address of a transmitting destination, a name of the transmitting destination, and a public key (digital certification) for each transmitting destination. In a case that MFP 100 receives an e-mail from a registered e-mail address (for example, in a case that MFP 100 receives an encrypted e-mail from an address of a name "okamoto"), key storage unit 232 also stores therein a private key. In a case that the transmitting destination is an MFP, key storage unit 232 also stores therein an identifier and an IP address of the relevant MFP. In a case that check box 334 is checked, all of public keys stored in key storage unit 232 are distributed while being packed with the intermediate application.

In a case that a check box 335 is checked, a public key for an MFP among the public keys stored in key storage unit 232 is distributed while being packed with the intermediate application. This public key is key information of an MFP forming virtual sub-network 501. In a case that a check box 336 is checked, data to be transmitted through a protocol other than e-mail is also subjected to the S/MIME encryption processing.

In this embodiment, examples of the protocol causing an image processing apparatus such as an MFP to execute imaging processing include LPR (Line Printer Daemon Protocol), IPP (Internet Printing Protocol) and SMB (Server Message Block); however, the protocol is not limited to these examples. In the case that check box 336 is checked, check boxes 3361 to 3363 are allowed to be checked. In a case that check box 3361 or the like is checked, transmission data in a case of requesting imaging processing by the designated protocol is encrypted using the S/MIME.

With reference to FIG. 6 again, MFP 100 includes print request reception unit 205 and S/MIME decryption unit 206. In a case that data which receives a printing command by the aforementioned printing protocol and is encrypted using the S/MIME is transmitted to MFP 100 (in this case, data to be subjected to the imaging processing such as printing is transmitted in a format that such data is attached to an e-mail), the data encrypted using the S/MIME is decrypted, and then is subjected to the printing processing in printer unit 14.

When distribution request reception unit 201 receives contents of designation in the screen shown in FIG. 7, intermediate application generation unit 202 acquires a program module of the intermediate application from intermediate application storage unit 231 and, also, generates a data file to be distributed to a user while being packed with the intermediate application. Herein, key generation/extraction unit 203 extracts an encryption key to be packed from key storage unit 232 to transmit the encryption key to intermediate application generation unit 202.

Figure 9:
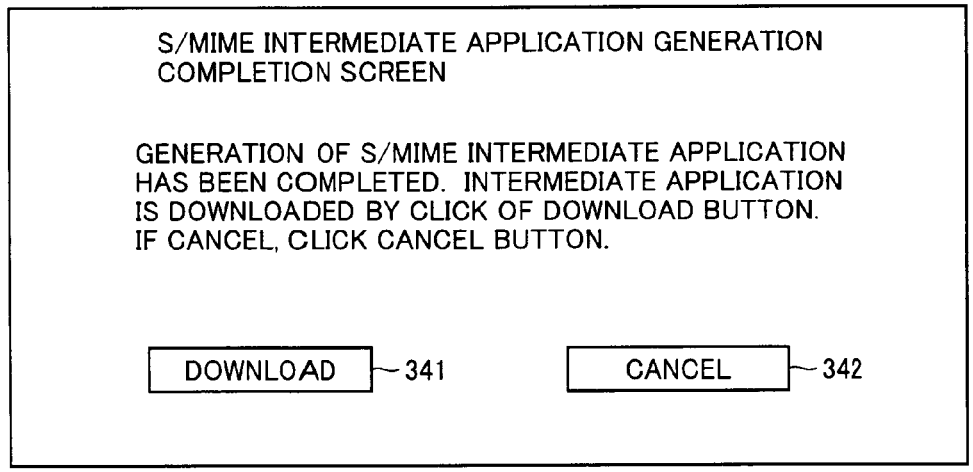
FIG. 9 shows a screen displayed on a browser in an external apparatus such as the PC which issues an intermediate application distribution request, upon completion of generation of an intermediate application to be distributed.

FIG. 9 shows a screen displayed on the browser of the external apparatus such as PC 31 which issues the intermediate application distribution request, upon completion of generation of the intermediate application to be distributed. When a download button 341 is clicked in this screen, the generated intermediate application is downloaded (in this case, the download can be cancelled by click of a cancel button 342).

For example, the intermediate application to be distributed is distributed in a file of a ZIP format containing a setup program for installation. The user receives the intermediate application, decompresses the file, and executes the setup program, thereby installing the intermediate application on PC 31.

(5) Details of Processing Performed by Intermediate Application

Figure 10:
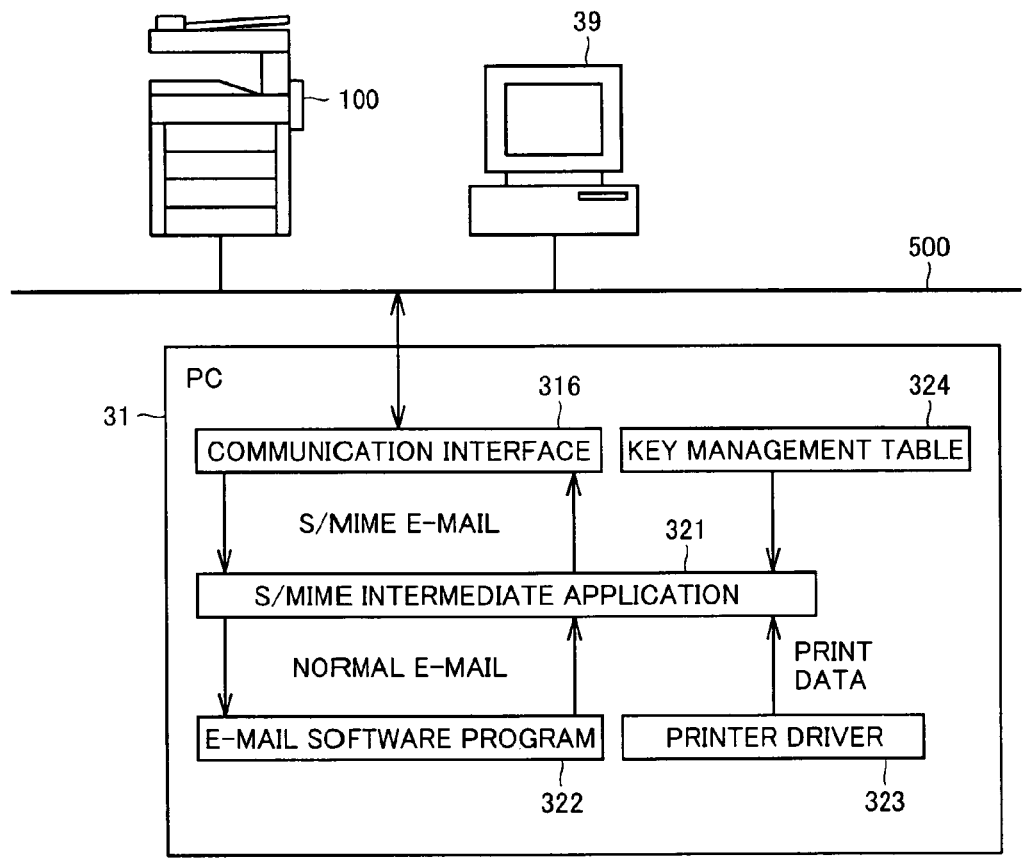
FIG. 10 shows a block diagram of a functional configuration of the PC on which the intermediate application is installed.

Hereinafter, details of processing performed by the intermediate application are described. FIG. 10 shows a block diagram of a functional configuration of PC 31 on which the intermediate application is installed. PC 31 includes a communication interface 316, and can establish communications with an external apparatus (FIG. 7 shows MFP 100 and an e-mail server 39, but does not show MFP 100A and the like) connected to network 500 via communication interface 316.

Intermediate application 321, an e-mail software program (mailer) 322 and a printer driver 323 run on a CPU of PC 31. Intermediate application 321 monitors data of an e-mail (a normal e-mail which is not encrypted using S/MIME) transmitted by a command from e-mail software program 322 and print data transmitted by a command from printer driver 323. In a case that a predetermined requirement is satisfied, intermediate application 321 executes S/MIME encryption processing to generate an S/MIME e-mail. In the encryption, intermediate application 321 refers to contents in a key management table 324. Key management table 324 contains data of the key distributed to PC 31 while being packed with the intermediate application, from the key information stored in the distributing source of the intermediate application as shown in FIG. 8.

Figure 11:
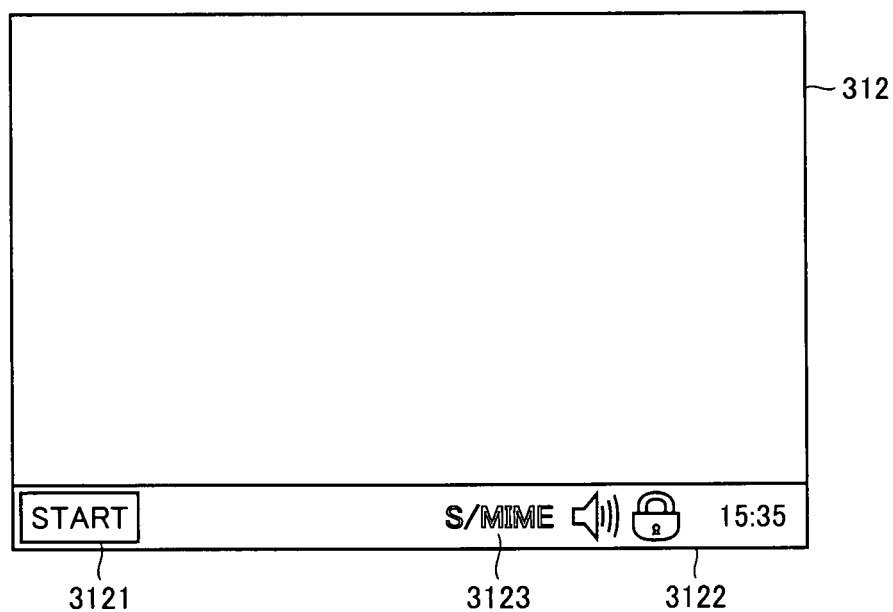
FIG. 11 shows a screen displayed on a display unit of the PC.

Intermediate application 321 operates as an application (process) different from e-mail software program 322 or printer driver 323. FIG. 11 shows a screen displayed on a display unit 312 of PC 31. An indicator indicating a time and a running application (process) is displayed on a notification area in an area 3122 which displays a start button 3121 and the like and is referred to as a so-called task bar. In FIG. 11, when the intermediate application runs, an indicator 3123 indicating the running of the intermediate application is displayed. Intermediate application 321 is registered as an application program which starts to run automatically upon startup, thereby starting to run automatically on boot-up of PC 31.

Figure 12:
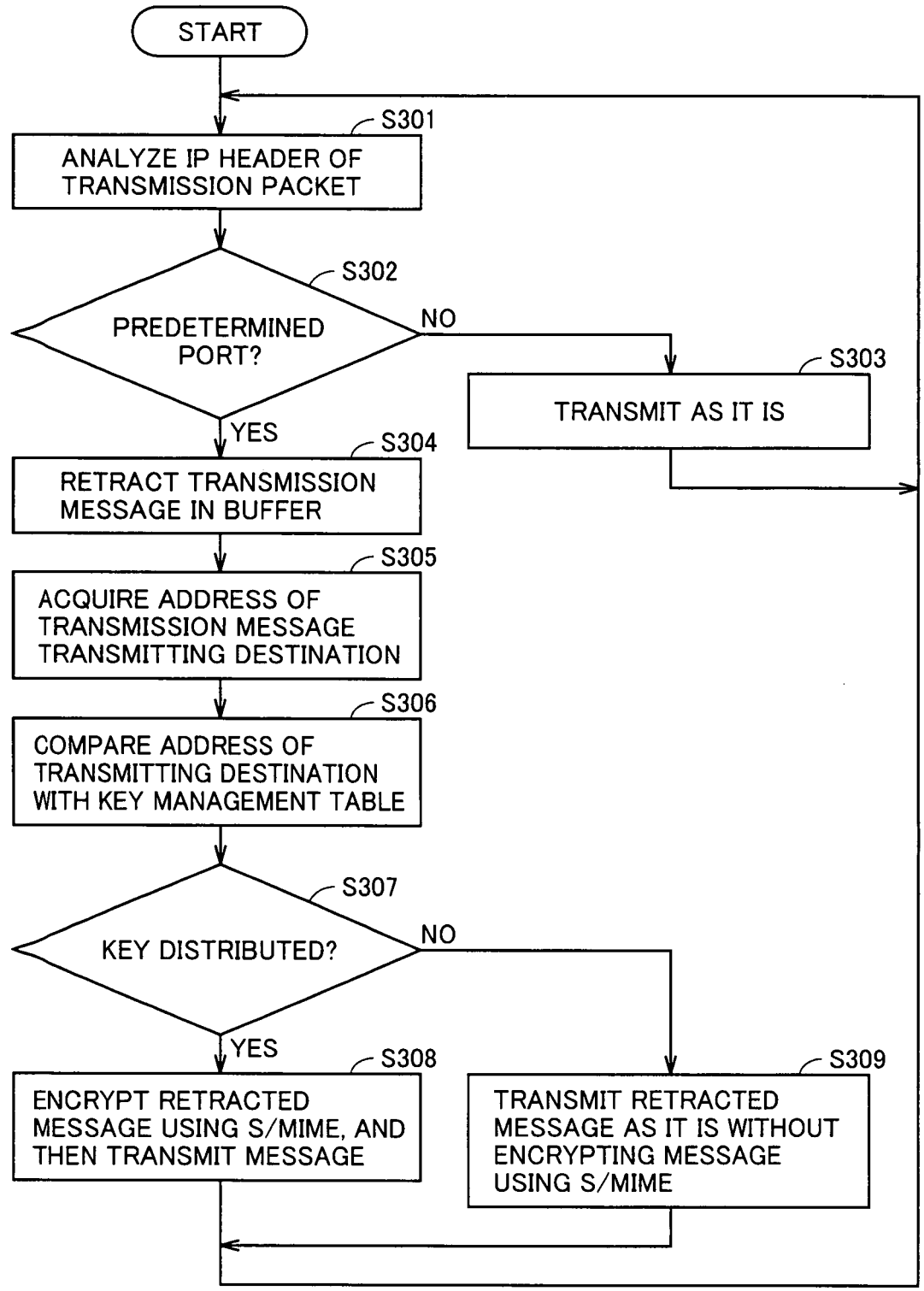
FIG. 12 shows a flowchart of processing of monitoring data transmitted externally, in the information processing apparatus such as the PC on which the intermediate application is installed.

FIG. 12 shows a flowchart of processing of monitoring data transmitted externally, in the information processing apparatus such as PC 31 on which intermediate application 321 is installed.

The intermediate application analyzes a header of an IP packet to be transmitted (S301). Then, the intermediate application refers to a port number to determine whether or not the port number is a predetermined port number (S302). If the port number does not correspond with the predetermined port number, the intermediate application transmits the data as it is (S303). Herein, examples of the "predetermined port number" include a port number 25 in a case of transmission by e-mail, a port number (e.g., 515) corresponding to an LPR protocol in a case that check box 3361 shown in FIG. 7 is checked, a port number (e.g., 631) corresponding to an IPP protocol in a case that check box 3362 is checked, and the like; however, the predetermined port number is not limited to these examples.

If the port number corresponds with the predetermined port number (YES in S302), the intermediate application temporarily retracts a transmission message in a buffer (not shown) (S304), and acquires information about an address of a transmitting destination (S305). Then, the intermediate application compares the address of the transmitting destination with contents in key management table 324 which manages distributed encryption keys (S306).

If a key corresponding to the address of the transmitting destination is distributed to key management table 324 (YES in S307), the intermediate application encrypts the massage retracted in the buffer using S/MIME, and then transmits the encrypted message (S308). If the key is not distributed to key management table 324 (NO in S307), the intermediate application transmits the retracted message as it is without encrypting the message using the S/MIME (S309). Herein, data from printer driver 323 is also encrypted using the S/MIME, and then is transmitted to the image processing apparatus in a format of e-mail.

Figure 13:
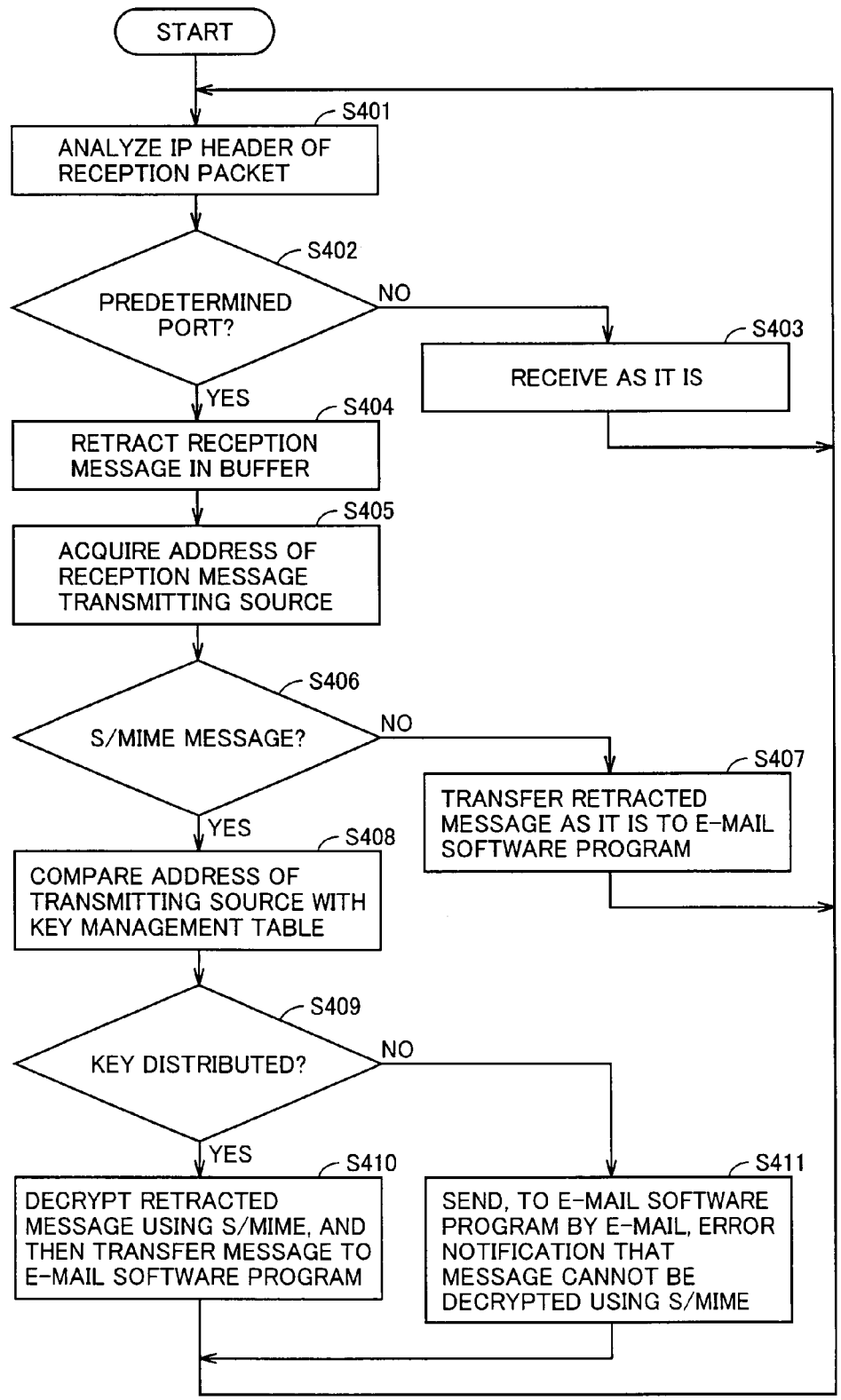
FIG. 13 shows a flowchart of details of processing performed by the intermediate application upon reception of external data.

Next, details of processing performed by the intermediate application upon reception of external data are described. FIG. 13 shows a flowchart of details of processing performed by the intermediate application in this case.

First, the intermediate application analyzes an IP header of a packet to be received (S401). If a port number does not correspond with a predetermined port number (NO in S402), the intermediate application receives the data as it is (S403). Herein, it is considered that the predetermined port number is a port number 110 in a case of reception by e-mail (POP3).

If the port number corresponds with the predetermined port number (YES in S402), the intermediate application temporarily retracts a reception message in the buffer (S404), and acquires information about an address of a transmitting source (S405). Next, the intermediate application determines whether or not the message is encrypted using the S/MIME. If the message is not encrypted using the S/MIME (NO in S406), the intermediate application transfers the retracted message as it is to the e-mail software program (S407).

If the message is encrypted using the S/MIME (YES in S406), the intermediate application compares the address of the transmitting source with the contents in key management table 324 (S408). If a key corresponding to the address of the transmitting source is distributed to key management table 324 (YES in S409), the intermediate application decrypts the retracted message using the S/MIME, and transfers the decrypted message to the e-mail software program (S410). If the key is not distributed to key management table 324, the intermediate application sends, to the e-mail software program by e-mail, error notification that the message cannot be decrypted and the e-mail software program cannot refer to contents of the message (S411). Herein, data encrypted using the S/MIME may be attached to this error notification e-mail.

With the application program distributing apparatus and the like according to this embodiment, as described above, the user can readily carry out data communications using encryption processing without concern for the encryption processing. The intermediate application according to this embodiment can encrypt data to be subjected to imaging processing, using S/MIME. In addition to data of an e-mail, therefore, the intermediate application can realize imaging processing with enhanced confidentiality.

Modifications

The embodiment of the present invention has been described above. It is needless to say that the present invention is not limited to the specific examples described in the foregoing embodiment. For example, the embodiment may be modified as follows.

(1) In the foregoing embodiment, the screen shown in FIG. 7 is displayed on the browser of the external apparatus such as PC 31. Alternatively, this screen may be displayed on a display unit of an MFP. Herein, if a user designates an address (e.g., an e-mail address) of an intermediate application distributing destination, the MFP can send to the distributing destination an e-mail to which a generated intermediate application is attached. An external apparatus such as a PC can receive the e-mail, thereby installing thereon the intermediate application.

(2) Although not described in the foregoing embodiment, if the number of MFPs forming virtual sub-network 501 is reduced, preferably, key information of the reduced MFPs are deleted from key storage unit 232 upon detection of the reduction. If the MFP having information deleted from key storage unit 232 once is connected to virtual sub-network 501 again, user data exchange is performed anew. Therefore, key information exchange may be performed again here.

Moreover, virtual sub-network 501 manages an intermediate application distributing destination. If the number of image processing apparatuses forming virtual sub-network 501 is increased or decreased, this fact may be notified to the intermediate application distributing destination. Herein, if the number of image processing apparatuses is increased, encryption key information of the increased image processing apparatuses may be transmitted to the intermediate application distributing destination.

(3) In a case that the intermediate application encrypts not only e-mail data, but also data to be subjected to imaging processing, such as print data, a module configuration of the intermediate application may be optional. For example, there may be prepared different applications (different processes): an intermediate application for encrypting e-mail data and an intermediate application for encrypting print data and the like. Alternatively, an application may be prepared for each protocol.

In this case, a timing that an intermediate application starts to run can be changed for each application (process). For example, different applications may start to run at different timings: an intermediate application for encrypting e-mail data starts to run on boot-up of a PC, and an intermediate application for encrypting print data starts to run at activation of a printer driver.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An application program distributing apparatus for distributing a first application program running on an information processing apparatus,
   the first application program to be distributed causing said information processing apparatus to execute at least
   monitoring processing of monitoring data transmitted externally from said information processing apparatus via a network by a second application program running on said information processing apparatus, said second application program being configured to execute data transmission to an other information processing apparatus except for the application program distributing apparatus and the information processing apparatus on which the first application program is running, and
   encryption processing of encrypting the data to be transmitted when a predetermined requirement is satisfied,
   said application program distributing apparatus comprising:
   an encryption key storage unit for storing therein an encryption key used in said encryption processing; and
   an encryption key extraction unit for extracting, from said encryption key storage unit, the encryption key to be distributed together with said first application program upon distribution of the first application program.

2. The application program distributing apparatus according to claim 1, wherein
   said information processing apparatus monitors at least a port number of an IP header to be transmitted externally, in said monitoring process.

3. The application program distributing apparatus according to claim 1, wherein
   said information processing apparatus executes said encryption processing using S/MIME (Secure/Multipurpose Internet Mail Extensions).

4. The application program distributing apparatus according to claim 1, wherein
   said predetermined requirement is that the data to be transmitted is data of an e-mail transmitted on the Internet and said information processing apparatus receives an encryption key corresponding to an e-mail address of a transmitting destination.

5. The application program distributing apparatus according to claim 1, wherein
   said first application program to be distributed starts to run on boot-up of said information processing apparatus, independently of said second application program.

6. The application program distributing apparatus according to claim 1, further comprising:
   a request key information reception unit for receiving, from a distribution requesting source, information suggesting encryption of data to be transmitted to which transmitting destination, in said encryption processing, wherein
   said encryption key extraction unit executes the encryption key extraction processing on the basis of the information received by said request key information reception unit.

7. The application program distributing apparatus according to claim 1, further comprising:
   an encryption key generation unit for generating an encryption key for a requesting source which requests the distribution of the first application program.

8. The application program distributing apparatus according to claim 1, wherein
   said second application program issues a request of image-data processing to an external image processing apparatus.

9. An image processing apparatus for distributing, via a network, a first application program running on an information processing apparatus connected to the network, the first application program to be distributed causing said information processing apparatus to execute at least
   monitoring processing of monitoring data transmitted to the image processing apparatus via the network by a second application program running on said information processing apparatus, said second application program being configured to execute data transmission to an other information processing apparatus except for the image processing apparatus and the information processing apparatus on which the first application program is running, and
   encryption processing of encrypting the data to be transmitted when a predetermined requirement is satisfied,
   said image processing apparatus comprising:
   an encryption key storage unit for storing therein an encryption key used in said encryption processing; and
   an encryption key extraction unit for extracting, from said encryption key storage unit, the encryption key to be distributed together with said first application program upon distribution of the first application program.

10. The image processing apparatus according to claim 9, wherein said predetermined requirement is that the data to be transmitted is data of an e-mail transmitted on the Internet and said information processing apparatus receives an encryption key corresponding to an e-mail address of a transmitting destination.

11. The image processing apparatus according to claim 9, wherein
said second application program issues a request of imaging processing to one of said image processing apparatus and another image processing apparatus.

12. The image processing apparatus according to claim 11, wherein
said predetermined requirement is that said information processing apparatus receives an encryption key for the image processing apparatus which is a requesting destination to which the request of the imaging processing is issued.

13. The image processing apparatus according to claim 9, wherein
said information processing apparatus executes said encryption processing using S/MIME (Secure/Multipurpose Internet Mail Extensions).

14. The image processing apparatus according to claim 9, further comprising:
a request key information reception unit for receiving information suggesting encryption of data to be transmitted to which image processing apparatus, in said encryption processing, wherein
said encryption key extraction unit executes the encryption key extraction processing on the basis of the information received by said request key information reception unit.

15. The image processing apparatus according to claim 14, wherein
said encryption key extraction unit extracts all of encryption keys stored in said image processing apparatus.

16. The image processing apparatus according to claim 9, further comprising:
a transmission protocol information reception unit for receiving information suggesting encryption of data to be transmitted using which protocol, in said encryption processing, wherein
said image processing apparatus changes details of processing performed by the first application program to be distributed, on the basis of the information received by said transmission protocol information reception unit.

17. The image processing apparatus according to claim 9, wherein
said first application program causes said information processing apparatus to execute encryption key acquisition processing of newly acquiring, from an image processing apparatus determined as an identical group, an encryption key for the image processing apparatus.

18. The image processing apparatus according to claim 9, further comprising:
a decryption unit for decrypting externally received data when the data is subjected to encryption processing using S/MIME.

19. A non-transitory computer readable medium storing a program for causing an information processing apparatus to execute processing comprising:
receiving an encryption key distributed together with a first application program that runs on the information processing apparatus;
monitoring processing of monitoring data transmitted externally from said information processing apparatus via a network by a second application program running on said information processing apparatus, said second application program being configured to execute data transmission to an other information processing apparatus except for the information processing apparatus on which the first application program is running; and
encryption processing of encrypting the data to be transmitted using S/MIME (Secure/Multipurpose Internet Mail Extensions) when a predetermined requirement is satisfied.

20. The non-transitory computer readable medium according to claim 19, wherein said second application program issues a request of image-data processing to an external image processing apparatus.

21. The application program distributing apparatus according to claim 1, wherein the application program distributing apparatus, as a first image processing apparatus, and a plurality of further imaging processing apparatus form a virtual sub-network.

22. The application program distributing apparatus according to claim 21, wherein when one or more of the image processing apparatus leave the virtual sub-network, the encryption key stored in the encryption key storage unit that is associated with the image processing apparatus that left the virtual sub-network is deleted.

23. The application program distributing apparatus according to claim 1, wherein the application program distributing apparatus and the information processing apparatus are imaging apparatus.

* * * * *